United States Patent [19]

McDermott

[11] Patent Number: 5,211,475
[45] Date of Patent: May 18, 1993

[54] APPARATUS FOR DISSOLVING PARTICULATE SOLIDS IN LIQUIDS

[76] Inventor: Matthew McDermott, 3 Wellside Dr., Cambuslang, Glasgow G72 8TA, United Kingdom

[21] Appl. No.: 810,519

[22] Filed: Dec. 19, 1991

[51] Int. Cl.$^5$ .................. B01F 15/02; B01F 11/00
[52] U.S. Cl. .................. 366/137; 366/110; 366/153; 366/163; 366/182; 366/191; 222/133; 222/196; 222/318
[58] Field of Search .......... 366/110, 111, 114, 132, 366/136, 137, 151, 153, 154, 159, 161, 163, 167, 177, 179, 181, 182, 108; 222/129.2, 133, 152, 196, 318; 406/134, 141

[56] References Cited

U.S. PATENT DOCUMENTS

| Re. 32,841 | 1/1989 | Mulder | 406/134 |
|---|---|---|---|
| 3,819,157 | 6/1974 | Markfelt | 366/177 X |
| 3,893,655 | 7/1975 | Sandiford | 366/114 X |
| 4,007,921 | 2/1977 | Zingg | 366/136 X |
| 4,100,614 | 7/1978 | Mandt | 366/154 |
| 4,222,497 | 9/1980 | Lloyd et al. | 222/57 |
| 4,407,431 | 10/1983 | Hutter, III | 366/137 X |
| 4,664,528 | 5/1987 | Rodgers et al. | 366/137 X |
| 4,863,277 | 9/1989 | Neal et al. | 366/137 |
| 4,952,340 | 8/1990 | Wentworth, Jr. | 261/30 |
| 4,955,723 | 9/1990 | Schneider | 366/136 |

FOREIGN PATENT DOCUMENTS

| 890285 | 2/1962 | United Kingdom | 366/137 |
|---|---|---|---|
| 1007509 | 10/1965 | United Kingdom | 366/163 |
| 1590702 | 6/1981 | United Kingdom | 222/196 |

*Primary Examiner*—Harvey C. Hornsby
*Assistant Examiner*—Charles Cooley
*Attorney, Agent, or Firm*—Ratner & Prestia

[57] ABSTRACT

A particulate material (for example, calcium hypochlorite granules and dust) in a drum is dissolved in a liquid (for example, water) in a tank. The liquid is recirculated by a pump via a venturi assembly to produce a vacuum applied via a vacuum tank to a lance inserted in the drum. The vacuum transports dust into the venturi assembly to dissolve in the circulating liquid, while granules are transported into the vacuum tank whence they are discharged into the mixing tank by a solenoid valve.

7 Claims, 5 Drawing Sheets

APPARATUS FOR DISSOLVING PARTICULATE SOLIDS IN LIQUIDS

This invention relates to an apparatus for dissolving solids in liquids and is particularly, but not exclusively, applicable to making up chlorine solutions for use in swimming pools.

BACKGROUND OF THE INVENTION

In large, commercially operated swimming pools it is usual to introduce a liquid chlorine solution into the pool water via a metering pump. For economy of transport and storage, chlorine compounds such as calcium hypochlorite are supplied in granule form in drums. Current practice is for the granules to be dissolved in water by hand mixing, and the resulting solution placed in a metering pump reservoir.

This procedure has a number of disadvantages. The mixing requires an operator in attendance, and tends to be carried out by non-technical personnel to a low level of accuracy. The granular material is degraded during transport, resulting in a mixture of granules and fine powder or dust in the drum; hand mixing leaves a residue of dust in the foot of the drum, which dust is difficult for the operator to measure accurately.

A principal object of the present invention is to overcome or mitigate these problems.

SUMMARY OF THE INVENTION

The invention, in one aspect, accordingly provides an apparatus for forming a controlled solution of a particulate solid in a liquid, comprising: a mixing tank for holding a known quantity of said liquid; means for recirculating said liquid from said mixing tank through a conduit leading from and back to said mixing tank; said conduit containing a venturi assembly which has a communicating means to a container for said particulate solid; said venturi assembly operating to form a partial vacuum; said partial vacuum, in use, transporting said particulate solid from said container.

In a preferred embodiment, for use where the solid is in the form of granules mixed with dust said apparatus including; a vacuum tank interposed in said communicating means, between said venturi assembly and said container whereby granules transported from said container are trapped in said vacuum tank while said dust passes through said communicating means to be entrained in said liquid in said venturi assembly, said vacuum tank being positioned above said mixing tank and being provided with a valve which is openable to empty said granules in said vacuum tank into said mixing tank.

Preferably, the apparatus includes means for opening said valve of said vacuum tank after a predetermined period of operation of said recirculating means.

Preferably also, a metering pump is provided for dispensing solution from said mixing tank.

Preferably, the particulate solid is taken from said container which is in the form of a removable drum, through said communicating means which comprises a lance for insertion in said removable drum, connected to said venturi assembly via a flexible hose.

The apparatus preferably includes container receiving means for holding and vibrating the container. In a particularly preferred form, the recirculating means comprises a pump which is mounted on the container receiving means so as to impart vibration thereto.

From another aspect, the invention provides an apparatus for use in emptying particulate material from a container comprising: a base plate inclined at an angle to a horizontal plane; and a back plate inclined at an angle to a vertical plane; said base plate and said back plate forming a receptacle for holding said container in an inclined position; said back plate mounting a motor which, in operation, imparts vibration to said back and thus to said container.

Preferably, the motor drives a pump used in emptying the drum.

Preferably the pump circulates liquid via a venturi to create a partial vacuum which is communicated to a hollow lance insertable in particulate material in the drum.

BRIEF DESCRIPTION OF THE DRAWINGS

An embodiment of the invention will now be described, by way of example only, with reference to the drawings, in which.

DESCRIPTION OF PREFERRED EMBODIMENTS

Figure 1:
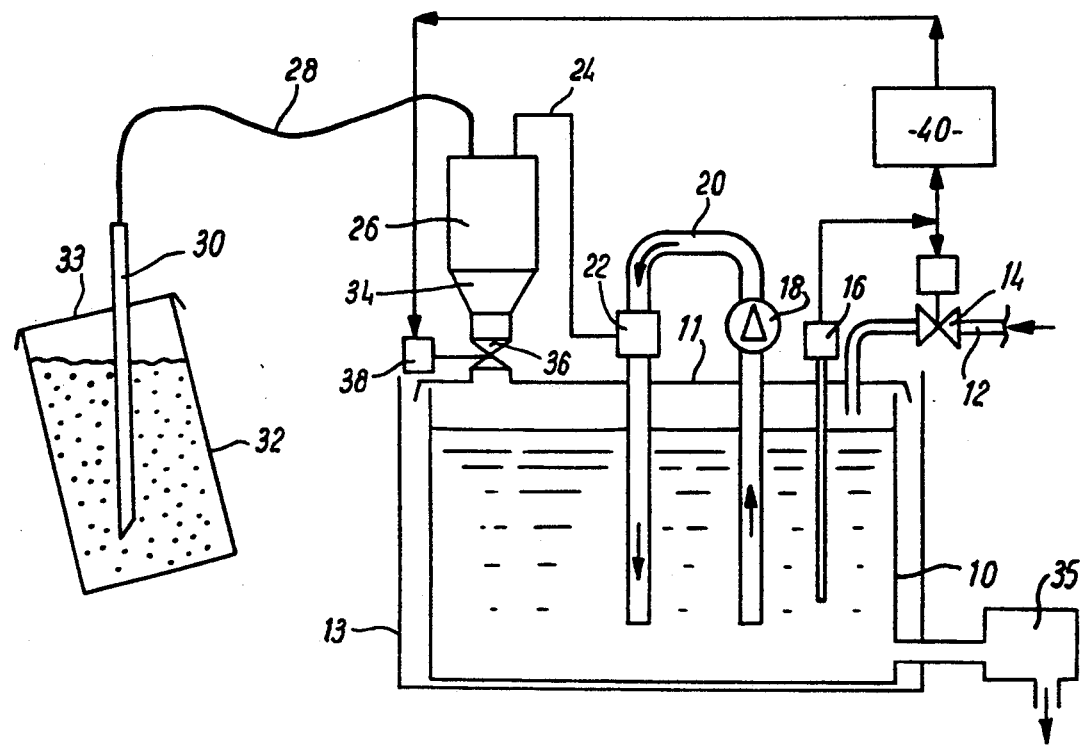
FIG. 1 is a schematic diagram illustrating the operation of an mixing apparatus in accordance with the invention.

Referring to FIG. 1, water is fed to a mixing tank 10 from the mains supply via an inlet pipe 12 and solenoid valve 14. The valve 14 is controlled by a depth sensor 16 to give a predetermined depth (and thus volume) of water in the mixing tank 10.

The water is circulated by a pump 18 through a conduit 20 which includes a venturi assembly 22. Passage of the water through the venturi assembly 22 produces a partial vacuum in line 24 which is connected to a vacuum cylinder 26, which in turn is connected via a flexible hose 28 to a tubular lance 30. The lance 30 has an open lower end which is inserted in a drum 32 containing calcium hypochlorite in the form of granules mixed with a proportion of dust.

The partial vacuum in the cylinder 26 draws a mixture of air, granules and dust through the lance 30 and hose 28 into the cylinder 26. The partial vacuum creates a pipeline velocity in the hose 28 which deposits the granules in the cylinder 26, while the dust passes through with the air to the venturi assembly 22 in which it becomes entrained in, and subsequently dissolves in, the circulating water.

The vacuum cylinder 26 is provided with a hopper-shaped lower part 34 closed by a valve 36 controlled by solenoid 38. In a simple form of the invention, the solenoid 38 is operated by a timing circuit 40 to open the valve 36 a predetermined time after the mixing tank has been filled. At this point the vacuum tank 26 contains a quantity of granules which falls into the mixing tank 10. The pump 18 continues to run, to promote dissolving of the granules, but the open valve 36 prevents vacuum passing to the hose 28 to transport further chloride. The vacuum tank 26 may optionally include a weight or depth sensor to actuate the solenoid 38 if the tank 26 is overfilled with granules before the timing circuit 40 operates.

Thus, with the present embodiment an operator simply has to insert the lance 30 in the drum and switch on the apparatus. At a given time later, the mixing tank 10 contains a known quantity of chlorine solution. The strength of the solution is determined by the vacuum, which in turn is a function of the pump rate and the venturi dimensions, and the time the valve 36 is closed, and is much more accurate than manual mixing.

The solution thus produced may be used to supply a conventional metering pump 35 for application to a swimming pool. Alternatively, since the tank 10 contains a known quantity of the solution at a known concentration, these contents could be added to a swimming pool by gravity or non-metering pump on a regular basis, say once per day.

It would also be possible to operate the apparatus continuously, with the tank 10 connected to supply a metering pump 35 directly. In this case, the outlet from the tank to the metering pump 35 would be provided with a filter to prevent the discharge of undissolved granules.

In the interests of safety, the drum 32 is closed in use by a cover 33 which is apertured for the lance 30, while the mixing tank 10 is closed by a cover 11 and enclosed within a liquid-tight bund wall 13.

Figure 2:
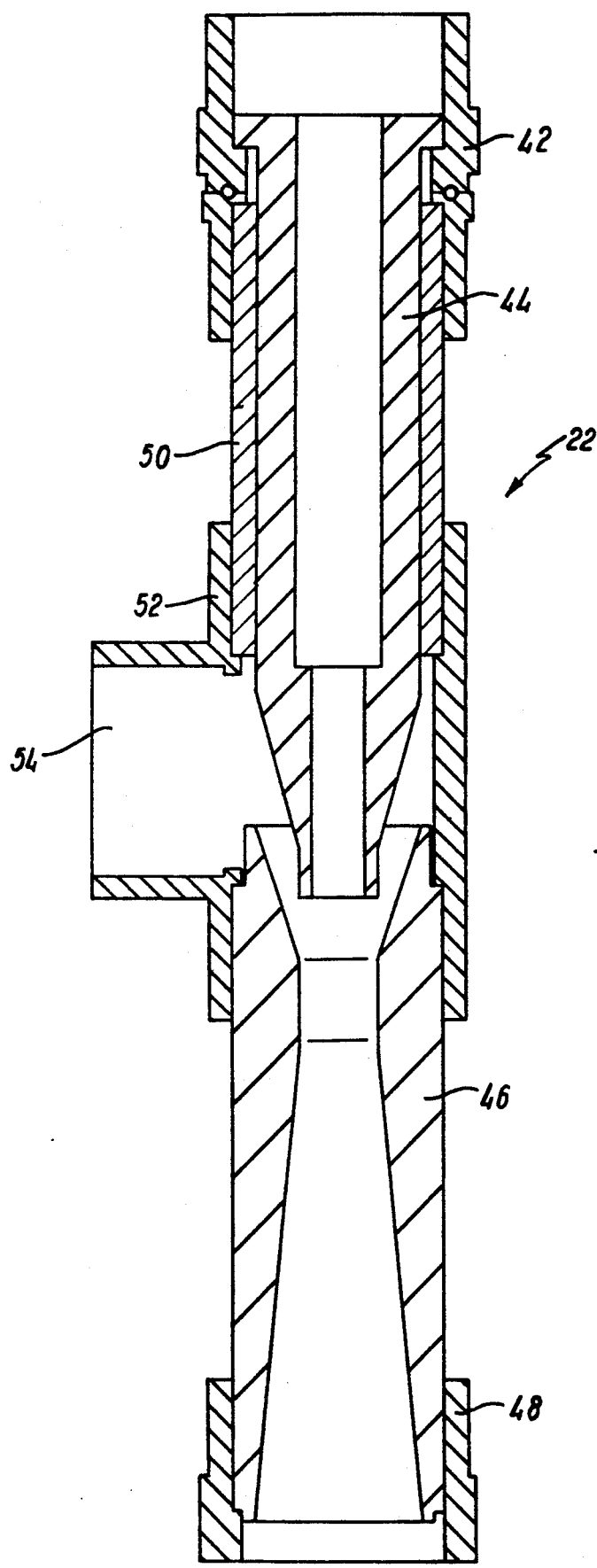
FIG. 2 is a detailed cross-section of a venturi assembly used in the apparatus of FIG. 1.

Turning to FIG. 2, the venturi assembly 22 comprises a water inlet connector 42, injector nozzle 44, venturi tube 46, and water outlet connector 48. A tubular spacer 50 and tee piece 52 maintain an entrainment space between the injector nozzle 44 and venturi tube 46, the tee piece 52 including a branch 54 for connection to the vacuum line 24.

Figure 3:
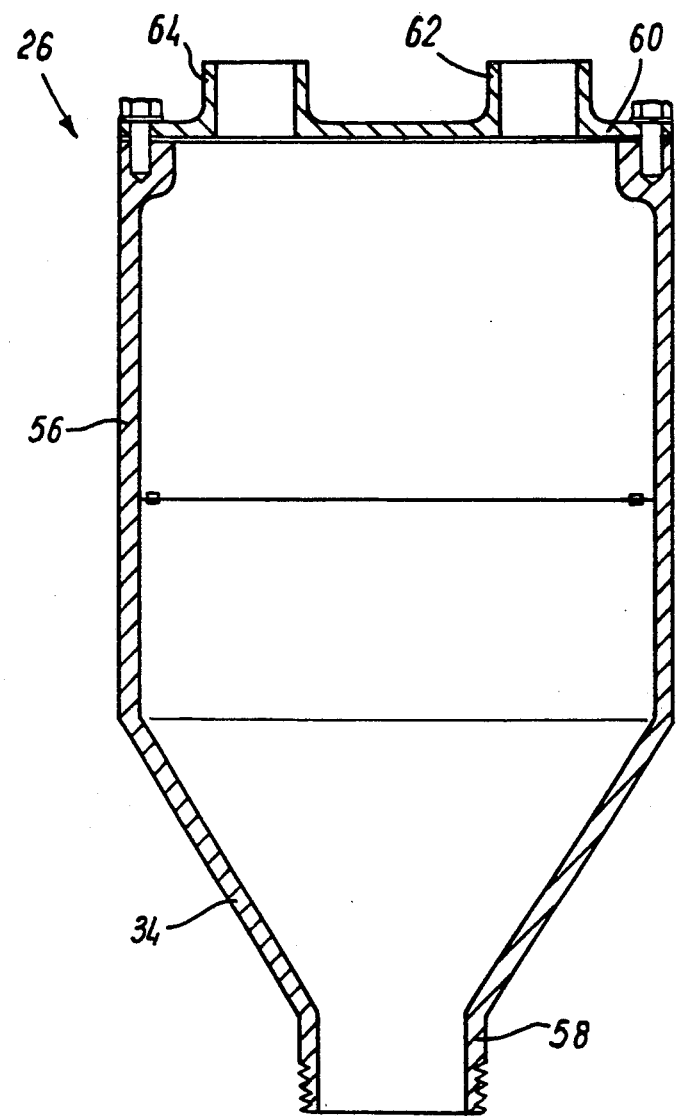
FIG. 3 is a cross-sectional elevation of a vacuum cylinder used in the apparatus.

As seen in FIG. 3, the vacuum cylinder 26 has a unitary body with a cylindrical main portion 56, and hopper shaped lower part 34 terminating in a boss 58 which is externally threaded for connection of the valve 36 (FIG. 1). The top of the cylinder 26 is closed by a bolted cover 60 formed with connectors 62, 64 for the vacuum line 24 and hose 28.

Figure 4A:
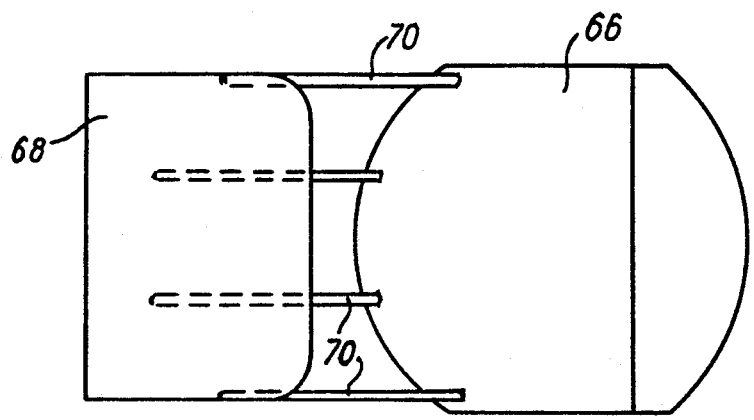
FIGS. 4a and 4b are a plan and elevation, respectively, of a drum holder and agitator used in the apparatus.
Figure 4B:
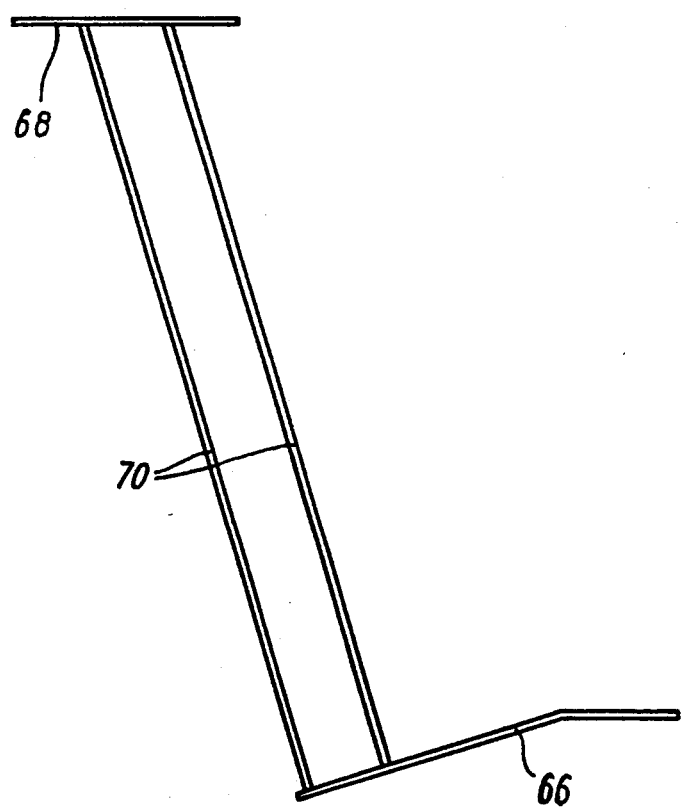
Figure 5:
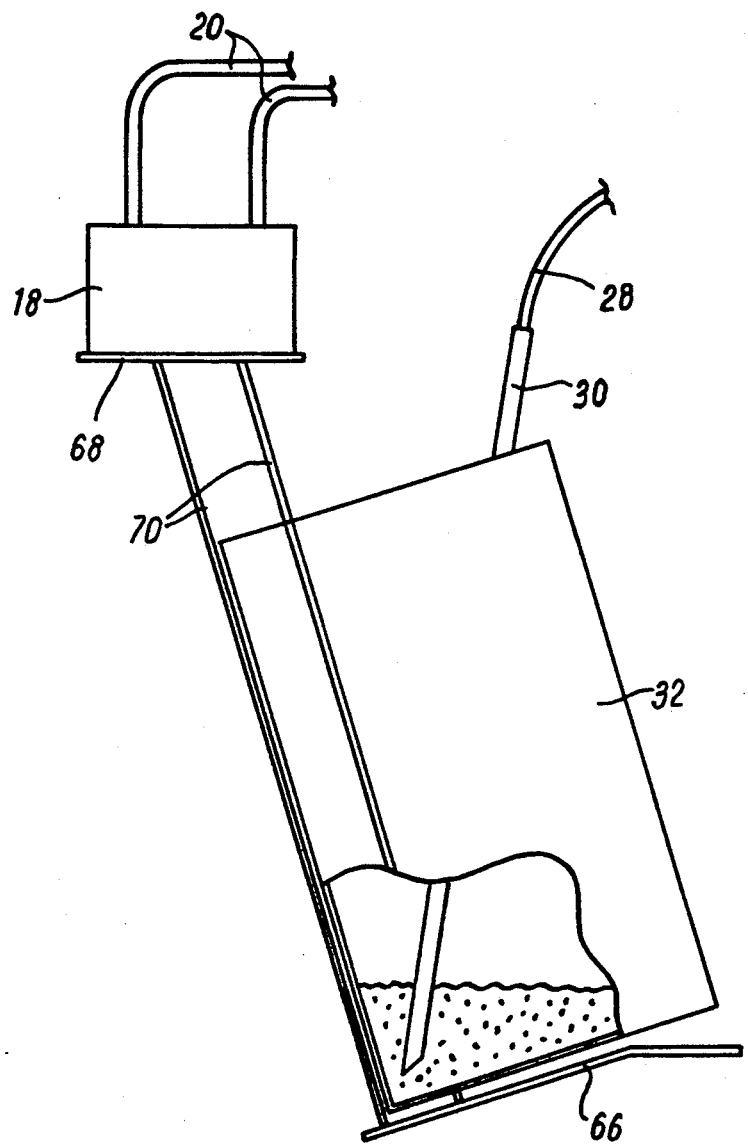
FIG. 5 is an elevation, partly in cross-section, of the drum holder and agitator of FIG. 4 in use.

Turning now to FIGS. 4 and 5, a further aspect of the present invention will be described. It is desirable that the apparatus, once set in action, can function without operator intervention, and that the lance 30 removes the contents of the drum 32 entirely and at a uniform rate.

A drum holder and agitator comprises a bottom plate 66 connected to a top plate 68 by four parallel rods 70 so as to hold the drum 32 in an inclined position. The water circulating pump 18 is mounted on the top plate 68, whereby operation of the pump 18 causes vibration of the rods 70 and thus of the drum 32. To enhance this action, it may be desirable to mount the pump 18 on the top plate 68 via soft rubber mountings and/or to provide an eccentric rotating weight on the pump. It is also necessary that the drum holder is not too rigid; it is presently preferred that the top and bottom plates 66, 68 are of 5 mm mild steel plate and the rods 70 of 10 mm mild steel.

The arrangement ensures, as indicated in FIG. 6 that the final contents of the drum migrate into a lower corner. It has been found that a simple open-ended tubular lance 30 can be pushed into a full drum and with the arrangement shown will also migrate as the drum empties until its open end rests in the lower corner.

Modifications and improvements may be incorporated without departing from the scope of the invention.

I claim:

1. An apparatus for forming a controlled solution of a particulate solid in a liquid, for use where said particulate solid is in the form of granules mixed with dust, comprising: a mixing tank for holding a known quantity of said liquid; means for recirculating said liquid from said mixing tank through a conduit leading from and back to said mixing tank; said conduit containing a venturi assembly which has a communicating means in communication with a container containing said particulate solid; said venturi assembly operating to form a partial vacuum in said communicating means; said partial vacuum, in use, transporting said particulate solid from said container to said venturi assembly; the apparatus further including a vacuum tank interposed in said communicating means between said venturi assembly and said container, whereby granules transported from said container are trapped in said vacuum tank while said dust passes through said communicating means to be entrained in said liquid passing through said venturi assembly, said vacuum tank being positioned above said mixing tank and being provided with a valve which is openable to empty said granules in said vacuum tank into said mixing tank.

2. An apparatus according to claim 1, including means for opening said valve of said vacuum tank after a predetermined period of operation of said recirculating means.

3. An apparatus according to claim 1, including a metering pump for dispensing said controlled solution from said mixing tank.

4. An apparatus according to claim 1, wherein said container is in the form of a removable drum, and said particulate solid is transported through said communicating means which comprises a lance for insertion in said removable drum and a flexible hose, said lance being connected to said venturi assembly via the flexible hose.

5. An apparatus according to claim 1, including a receiving means for holding and vibrating said container.

6. An apparatus according to claim 5, in which said recirculating means comprises a pump which is mounted on said receiving means so as to impart vibration thereto.

7. An apparatus according to claim 1, in which the apparatus further includes means for emptying said particulate solid from said container comprising a base plate inclined at an angle to a horizontal plane; and a back plate inclined at an angle to a vertical plane; said base plate and said back plate forming a receptacle for holding said container in an inclined position; said back plate mounting a motor which, in operation, imparts vibration to said back plate and thus to said container.

* * * * *